US00RE33890E

United States Patent [19]

Ohnari et al.

[11] E Patent Number: Re. 33,890

[45] Reissued Date of Patent: Apr. 21, 1992

[54] METHOD OF CONTROLLING ELECTRONIC FUEL INJECTION TO INTERNAL COMBUSTION ENGINE

[75] Inventors: Mikihiko Ohnari, Tokyo; Motohisa Funabashi, Sagamihara; Makoto Shioya, Tokyo; Teruji Sekozawa, Kawasaki; Masami Shida, Mito, all of Japan

[73] Assignee: Hitachi, Ltd., Tokyo, Japan

[21] Appl. No.: 417,900

[22] Filed: Oct. 6, 1989

Related U.S. Patent Documents

Reissue of:

[64] Patent No.: 4,697,566
Issued: Oct. 6, 1987
Appl. No.: 927,938
Filed: Nov. 7, 1986

[30] Foreign Application Priority Data

Nov. 13, 1985 [JP] Japan ..... 60-252723

[51] Int. Cl.[5] ..... F02D 41/24

[52] U.S. Cl. ..... 123/479; 123/478; 123/490; 364/431.11

[58] Field of Search ..... 123/478, 479, 481, 198 D, 123/630, 198 F; 364/431.11, 187

[56] References Cited

U.S. PATENT DOCUMENTS

| | | | |
|---|---|---|---|
| Re. 29,561 | 3/1978 | Ford | 123/490 X |
| 3,606,869 | 9/1971 | Huntzinger et al. | 123/478 |
| 3,654,905 | 4/1972 | Mennesson | 123/490 |
| 3,834,361 | 9/1974 | Keely | 123/479 |
| 3,835,825 | 9/1974 | Baxendale et al. | 123/490 X |
| 4,049,957 | 9/1977 | Kera et al. | 123/479 X |
| 4,414,949 | 11/1983 | Honig et al. | 123/479 |
| 4,532,594 | 7/1985 | Hosaka et al. | 364/431.11 |

FOREIGN PATENT DOCUMENTS

| | | | |
|---|---|---|---|
| 126402 | 11/1984 | European Pat. Off. . | |
| 173536 | 10/1982 | Japan . | |
| 124028 | 7/1983 | Japan | 123/479 |
| 108847 | 6/1984 | Japan | 123/479 |
| 2104247 | 3/1983 | United Kingdom | 123/479 |
| 2125578 | 3/1984 | United Kingdom . | |
| 2127507 | 4/1984 | United Kingdom . | |

OTHER PUBLICATIONS

"BMW Reveals V12 Details" from Autocar, Mar. 4, 1987, p. 6.

*Primary Examiner*—Tony M. Argenbright
*Attorney, Agent, or Firm*—Antonelli, Terry, Stout & Kraus

[57] ABSTRACT

A method of controlling fuel injection to an internal combustion engine by electronic circuits. A plurality of cylinders installed in the internal combustion engine are divided into two groups and two electronic circuits for controlling the respective two cylinder groups are provided. By comparing between the outputs of the two electronic circuits, whether the operations of the respective electronic circuits are normal or not is judged. The fuel injection controlled by the electronic circuit which has been judged to be abnormal is stopped, while the fuel injection controlled by the electronic circuit which has been judged to be normal is continued. Thus, the internal combustion engine is driven solely by one group of cylinders.

72 Claims, 2 Drawing Sheets

METHOD OF CONTROLLING ELECTRONIC FUEL INJECTION TO INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

The present invention relates to a method of controlling electronic fuel injection to an internal combustion engine and, more particularly, to a method of controlling fuel injection having high reliability which enables an engine to be constantly driven without being stopped by a trouble of a part of an electronic circuit.

The number of electronic parts mounted on an automobile has recently been increased, which tendency involves a fear of lowering the reliability of a car as a whole. If an electronic part of a fuel injection system is out of order and the engine is stopped, it is not easy to trace the fault and repair on the road, so that there is no alternative but to call a mechanic. If a trouble is caused in an unfrequented place, it puts a fellow passenger to much trouble. Furthermore, if a trouble which makes it impossible to run the car is caused while carrying a very important person even in a big city, there is a fear of incurring a great social and economical loss.

A conventional mechanical supply system composed of a carburetor scarcely causes sudden trouble and, in most cases, malfunction is gradually sensed and foreseen, so that the reliability of the carburetor system is secured by preventive maintenance and routine checkup. As to the reliability of electronic parts, if initial failure is eliminated by accelerated test, there remains only a probability of the rest of the parts generating random failure. In order to prevent the breakdown of the whole system due to a random failure of an electronic part which constitutes an electronic circuit, a method of allowing redundancy on the level of parts, circuits and system is often adopted.

A method of allowing redundancy on the level of parts and circuits is lacking in practicality because cost is raised due to increase in the number of parts, the decision circuit for judging the quality of parts and circuits is not always reliable, and the system becomes complicated by the incorporation of a defective part identifying circuit and an alarm circuit. If a redundancy system is adopted, a defective part must be replaced immediately in order to preserve the characteristic of the redundancy system. In order to maintain the reliability, it is desirable that immediately after a trouble is caused, a certain extent of burden is put to the driver, thereby urging the driver to replace the defective part.

SUMMARY OF THE INVENTION

Accordingly, it is an object of the present invention to provide what is called a fault tolerant method of controlling electronic fuel injection which enables an engine to be driven, incomplete as it is, without being completely stopped when a part of an electronic circuit has some trouble.

For example, the internal combustion engine of an automobile is able to be driven at a low torque when the fuel injection and ignition are carried out for only half the cylinders intalled. Notice has been taken of this fact, and the present invention has been achieved on the basis of this finding. To state this more concretely, two pairs of electronic circuits for controlling fuel injection and ignition are prepared. Each pair of circuits are so constituted as to charge the control of half the cylinders installed. In the normal state, the engine system is operated while ascertaining the synchronism and reasonableness check of both pairs of circuits, but when abnormality takes place, the engine is driven only by the normal part of circuits.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
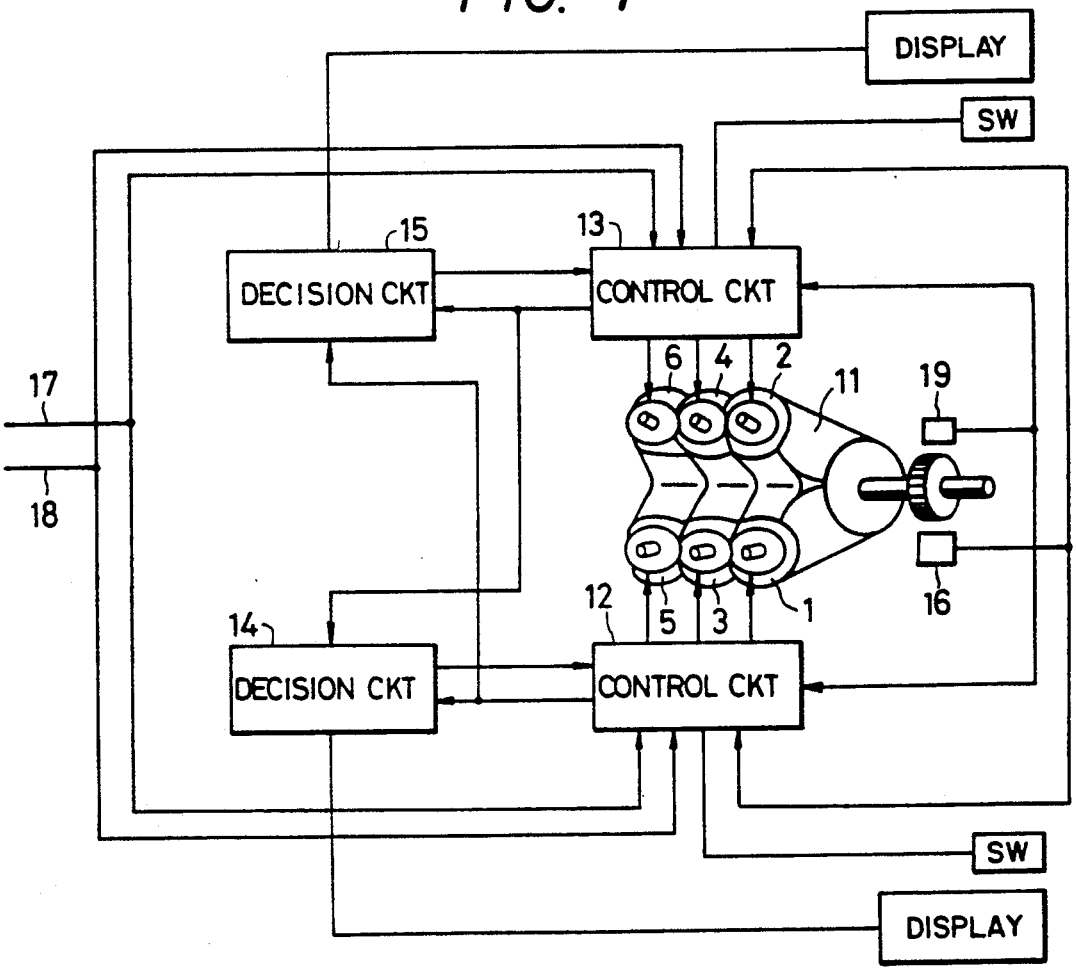
FIG. 1 shows the structure of an engine control system to which the present invention is applied.
Figure 2:
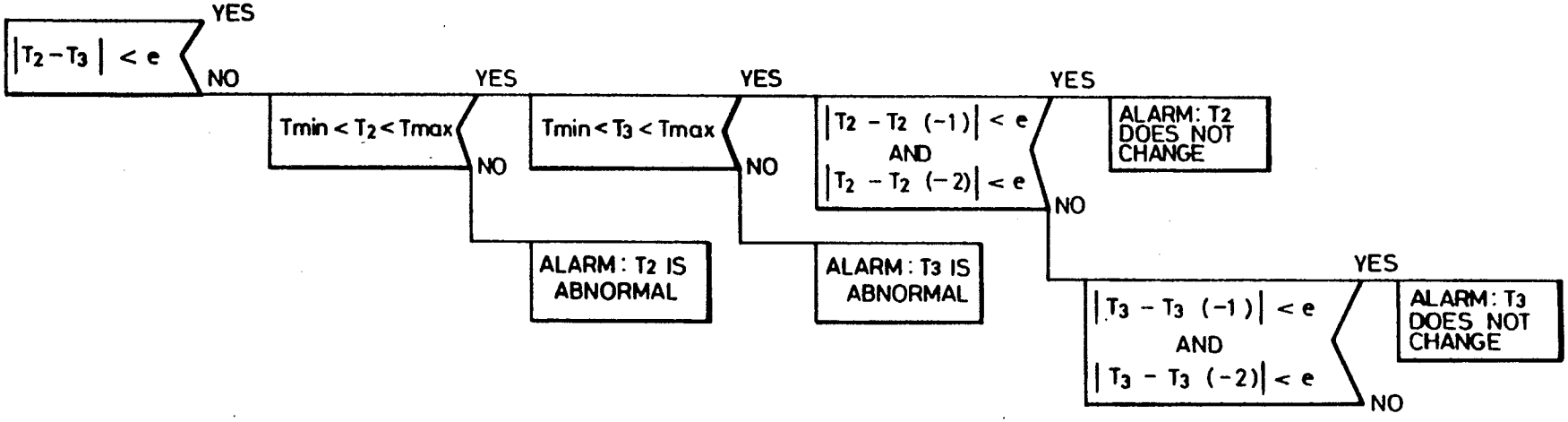
FIG. 2 is a flow chart which shows the operation and the process of a decision circuit.

An embodiment of the present invention will be described with reference to FIGS. 1 and 2. In FIG. 1, a 6-cylinder engine 11 having cylinders 1 and 6 is illustrated. Each cylinder is provided with an injector for fuel injection. The cylinders of the engine 11 are divided into two groups, and the amount of fuel injection and the injection timing of the cylinders 1, 3 and 5 are controlled by a control circuit 12, while those of the cylinders 2, 4 and 6 are controlled by a control circuit 13. The ignition system is the same as in the prior art. Each control circuit is different from a conventional electronic fuel injection control apparatus only in the following points. The input of a signal from each sensor and contents of carculation are approximately the same as conventional ones. Marked difference are that the ouptput torque in one cycle is equivalent to the output of half the cylinders and the timing process for it is therefore different, and that an interface unit for inputting/outputting the information to/from a decision circuit which decides normal/abnormality of the control circuit for controlling the other half cylinders is provided together with an information processing unit in order to prevent the engine from being stopped.

When both control circuits 12 and 13 are normal, the control circuit 12 controls the cylinders 1, 3 and 5 of odd numbers, while the control circuit 13 controls the cylinders 2, 4 and 6 of even numbers. Each control circuit detects the rotational speed of a shaft by a tachometer 16, a measured value 17 of air flow by an air flow meter (not shown), a cooling water temperature 18 by an engine cooling device (not shown), and other pieces of information (not shown) necessary for controlling the rotational frequency of the engine. Synchronization of the control circuits is carried out on the basis of the timing pulses which are synchronous with the rotation of the engine and which are detected by a timing pulse detector 19.

The normal or abnormality of the control circuits is decided by decision circuits 14 and 15 which are provided in correspondence to the respective control circuits. It is possible to incorporate the decision circuits into the respective control circuits. Each decision circuit fetches the calculated outputs of the control circuits 12 and 13, and judges whether there is a large difference between the calculated outputs of the control circuits 12 and 13. The process of decision is shown in FIG. 2. The fuel injection periods, which are the outputs of the control circuits 12 and 13, are assumed to be $T_2$ and $T_3$, respectively. If there is a large difference between the outputs of the circuits, namely, [$T_2-T_3 \geqq e$,] $|T_2-T_3| \geqq e$, one of the control circuits is out of order and the defective circuit delivers the output which is beyond the tolerance, or the output of one of the circuits is the same as the previous calculated output. In such case, that circuit is decided to be out of order. In FIG. 2, the symbol e denotes error. Tmin and Tmax the minimum value and the maximum value, respectively, of the injection period, and Ti(−j) a value of the injection time i obtained the period j before. The decision circuit gives information to the driver on which control circuit is decided to be out of order.

The driver manually cuts out the defective control circuit when he is informed of the defect of the control circuit, thereby stopping the supply of the fuel to the cylinders which are controlled by that control circuit. Simultaneously, he controls the remaining half cylinders by the normal control circuit. The manual cut-out is executed merely by designating the defective control circuit and switching in the interior of the car. That is, it is executed by cutting off the outputs of the other control circuit and the decision circuit which have been input to each control circuit by switching. Even if both control circuits are normal, it is possible to practice at driving with half the cylinders by cutting off one of the control circuits.

Although an injector is provided on each cylinder in this embodiment, it is possible to provide more than two injectors on a manifold and to provide a control circuit on each injector, providing slight modifications for the circuits.

According to this embodiment, even if a random failure is produced on a control circuit, it is possible to avoid the state in which driving is impossible by controlling half the cylinders by the other normal control circuit. This fact enables the driver to drive in an out-of-the-way place or carry a very important person without anxiety.

If a trouble is caused in a control circuit and the fact that the driver must cut out the circuit and drive thereafter with half the cylinders causes inconvenience to the driver, thereby urging the driver to replace the defective circuit, which leads to the enhancement of the reliability of the car.

Furthermore, since the driver can find the defective circuit easily, if the driver carries a spare control circuit (a printed circuit board), he can replace the printed circuit board in accordance with the instruction.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A method of controlling an electronic fuel injection to an internal combustion engine comprising the steps of:

dividing a plurality of cylinders installed on said internal combustion engine into two groups;

providing a plurality of injectors on each group of cylinders, and dividing said injectors into two groups in correspondence with said two groups of cylinders;

providing two electronic circuits for controlling said two groups of injectors, respectively, comparing the calculated outputs of fuel injection supplied from said two electronic control circuits, respectively;

judging whether or not the operations of said two electronic circuit are normal on the basis of the result of comparison; and stopping the fuel injection which is controlled by the electronic circuit which has been judged to be abnormal, while continuing the fuel injection which is controlled by the electronic circuit which has been judged to be normal.

2. A method according to claim 1, wherein the results of calculation which are respectively output from said two electronic circuits are displayed to the driver and are judged by said driver whether or not the respective operations of said electronic circuits are normal.

*3. A system for controlling electronic fuel injection to an internal combustion engine, comprising:*

*a plurality of cylinders installed on said internal combustion engine and divided into two groups;*

*a plurality of injectors for injecting fuel into said cylinders, respectively, said injectors being divided into two groups in correspondence with said two groups of cylinders;*

*two electronic circuits for controlling said two groups of injectors, respectively;*

*means for comparing the calculated outputs of fuel injection supplied from said two electronic control circuits, respectively, judging whether the operations of said two electronic circuits are normal on the basis of the result of said comparison and for stopping the fuel injection which is controlled by the electronic circuit which has been judged to be abnormal, while continuing the fuel injection which is controlled by the electronic circuit which has been judged to be normal.*

*4. A system according to claim 3, further comprising:*

*display means for displaying results of the calculation which are respectively output from said two electronic circuits to permit a driver to judge whether the respective operations of said electronic circuits are normal.*

*5. A system for controlling electronic fuel injection to an internal combustion engine, comprising:*

*a plurality of cylinders installed on said internal combustion engine and divided into two groups of equal numbers of cylinders;*

*a plurality of injectors which inject fuel into said cylinders, respectively, and which are divided into two groups in correspondence with said two groups of cylinders;*

*two electronic control circuits being provided separately and functionally identical in association to said two groups of cylinders and injectors, said electronic control circuits each calculating fuel injection periods and delivering output signals representing the calculated injection periods to said two groups of injectors in order to separately control said two groups of injectors;*

*two electronic decision circuits each being provided in association to one and the other of said electronic control circuits and having functions of*

*comparing output signals of said electronic control circuits with each other;*

*if a difference between said output signals exceeds a predetermined value judging whether or not said out-*

*put signals are within a predetermined tolerable range;*

*if both of said output signals are within the tolerable range, judging whether or not said output signals are changing with a lapse of time; and*

*deciding that the associated electronic control circuit is abnormal, if its output signal is judged to be outside the tolerable range or to be unchanged with the lapse of time, respectively; and*

*means for cutting off the outputs of the respective electronic control circuit decided to be abnormal.*

*6. A system according to claim 5, wherein said system, further comprises display means for displaying information of the electronic control circuit decided to be abnormal by the electronic decision circuit, and said means for cutting off is operated by a driver who recognizes the displayed information.*

*7. A method of controlling an electronic fuel injection to an internal combustion engine comprising the steps of:*

*dividing a plurality of cylinders provided in said internal combustion engine into two groups;*

*providing a plurality of injectors for supplying fuel to said cylinders, and dividing said injectors into two groups in correspondence with said two groups of cylinders; and*

*providing first and second electronic circuits each calculating fuel injection amounts to be supplied to said cylinders based upon sensed engine operating conditions to control said two groups of injectors, respectively, said first and second electronic circuits having no portion thereof which operates in common to control the outputs of both said first electronic circuit and said second electronic circuit.*

*8. A method of controlling an electronic fuel injection to an internal combustion engine comprising the steps of:*

*dividing a plurality of cylinders provided in said internal combustion engine into first and second groups;*

*providing at least one interior for supplying fuel to the cylinders of said first group and at least one injector for supplying fuel to the cylinders of said second group; and*

*providing a first electronic circuit for calculating fuel injection amounts based upon sensed engine operating conditions to control said at least one injector for supplying fuel to said cylinders of said first group and a second electronic circuit for calculating fuel injection amounts based upon sensed engine operating conditions to control said at least one injector for supplying fuel to said cylinders of said second group, said first and second electronic circuits having no portion thereof which operates in common to control the outputs of both said first electronic circuit and said second electronic circuit.*

*9. A method of controlling an electronic fuel injection to an internal combustion engine comprising the steps of:*

*dividing a plurality of cylinders provided in said internal combustion engine into two groups;*

*providing a plurality of injectors for supplying fuel to said cylinders, and dividing said injectors into two groups in correspondence with said two groups of cylinders;*

*providing two electronic circuits for controlling said two groups of injectors, respectively;*

*judging whether or not the operations of said two electronic circuits are normal; and*

*stopping the supply of fuel which is controlled by the electronic circuit which has been judged to be abnormal, while continuing the supply of fuel which is controlled by the electronic circuit which has been judged to be normal.*

*10. A method of controlling an electronic fuel injection to an internal combustion engine comprising the steps of:*

*dividing a plurality of cylinders provided in said internal combustion engine into first and second groups;*

*providing at least one injector for supplying fuel to the cylinders of said first group and at least one injector for supplying fuel to the cylinders of said second group;*

*providing a first electronic circuit for controlling said at least one injector for supplying fuel to said cylinders of said first group and a second electronic circuit for controlling said at least one injector for supplying fuel to said cylinders of said second group;*

*judging whether or not the operations of said first and second electronic circuits are normal; and*

*stopping the supply of fuel which is controlled by the electronic circuit which has been judged to be abnormal, while continuing the supply of fuel which is controlled by the electronic circuit which has been judged to be normal.*

*11. A method of controlling an electronic fuel injection to an internal combustion engine comprising the steps of:*

*dividing a plurality of cylinders provided in said internal combustion engine into two groups;*

*providing a plurality of injectors for supplying fuel to said cylinders, and dividing said injectors into two groups in correspondence with said two groups of cylinders;*

*providing two electronic circuits for controlling said two groups of injectors, respectively;*

*judging whether or not the operation of each of said two electronic circuits is normal on the basis of a time-sequential change of the calculated output of fuel injection delivered out of each of said electronic circuits; and*

*stopping the supply of fuel which is controlled by the electronic circuit which has been judged to be abnormal, while continuing the supply of fuel which is controlled by the electronic circuit which has been judged to be normal.*

*12. A method of controlling an electronic fuel injection to an internal combustion engine, comprising the steps of:*

*dividing a plurality of cylinders provided in said internal combustion engine into first and second groups;*

*providing at least one injector for supplying fuel to the cylinders of said first group and at least one injector for supplying fuel to the cylinders of said second group;*

*providing a first electronic circuit for controlling said at least one injector for supplying fuel to said cylinders of said first group and a second electronic circuit for controlling said at least one injector for supplying fuel to said cylinders of said second group;*

*judging whether or not the operation of each of said first and second electronic circuits is normal on the basis of a time-sequential change of the calculated output of fuel injection delivered out of each of said first and second electronic circuits; and*

*stopping the supply of fuel which is controlled by the electronic circuit which has been judged to be abnormal, while continuing the supply of fuel which is controlled by the electronic circuit which has been judged to be normal.*

*13. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders; and*

*a plurality of electronic circuits each calculating fuel injection amounts to be supplied to said cylinders based upon sensed engine operating conditions to control said groups of injectors, respectively, said electronic circuits having no portion thereof which operates in common with another electronic circuit to control the outputs of said plurality of electronic circuits.*

*14. A system according to claim 13, wherein said plurality of groups are two groups, and said plurality of electronic circuits are two electronic circuits.*

*15. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of sensors for detecting information necessary for operating said internal combustion engine; and*

*a plurality of electronic circuits for controlling said gropus of injectors, respectively, on the basis of outputs of said sensors, said electronic circuits having no portion thereof which operates in common with another electronic circuit to control the outputs of said plurality of electronic circuits.*

*16. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of sensors for detecting information necessary for operating said internal combustion engine; and*

*a plurality of electronic circuits for controlling said groups of injectors, respectively, on the basis of outputs of said sensors, said electronic circuits having no portion thereof which operates in common with another electronic circuit to control the outputs of said plurality of electronic circuits;*

*wherein at least one of said sensors is utilized for said plurality of electronic circuits in common so that an output of said at least one of sensors is applied to said plurality of electronic circuits.*

*17. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of sensors for detecting information necessary for operating said internal combustion engine;*

*a plurality of electronic circuits for controlling said groups of injectors, respectively, on the basis of outputs of said sensors, said second electronic circuits having no portion thereof which operates in common with another electronic circuit to control the outputs of said plurality of electronic circuits; and*

*detection means for detecting abnormality of said electronic circuits.*

*18. A system according to claim 17, wherein said internal combustion engine is operated with the group of injectors controlled by the electronic circuit other than the electronic circuit detected to be abnormal.*

*19. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of sensors for detecting information necessary for operating said internal combustion engine;*

*a plurality of electronic circuits for controlling said groups of injectors, respectively, on the basis of outputs of said sensors, said electronic circuits having no portion thereof which operates in common with another electronic circuit to control the outputs of said plurality of electronic circuits;*

*detection means for detecting abnormality of said electronic circuits; and*

*means for giving a driver information of the electronic circuit detected to be abnormal by said detection means.*

*20. A system according to claim 19, wherein said electronic circuit detected to be abnormal is able to be replaced with a spare electronic circuit by the driver.*

*21. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of sensors for detecting information necessary for operating said internal combustion engine;*

*a plurality of electronic circuits for controlling said groups of injectors, respectively, on the basis of outputs of said sensors, said electronic circuits having no portion thereof which operates in common with another electronic circuit to control the outputs of said plurality of electronic circuits; and*

*detection means for detecting abnormality of said electronic circuits;*

*wherein at least one of said sensors is utilized for said plurality of electronic circuits in common so that an output of said at least one of sensors is applied to said plurality of electronic circuits.*

*22. A system according to claim 21, wherein said internal combustion engine is operated with the group of injectors controlled by the electronic circuit other than the electronic circuit detected to be abnormal.*

*23. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of sensors for detecting information necessary for operating said internal combustion engine;*

*a plurality of electronic circuits for controlling said groups of injectors, respectively, on the basis of outputs of said sensors, said electronic circuits having no portion thereof which operates in common with another electronic circuit to control the outputs of said plurality of electronic circuits;*

*detection means for detecting abnormality of said electronic circuits; and*

*means for giving a driver information of the electronic circuit detected to be abnormal by said detection means;*

*wherein at least one of said sensors is utilized for said plurality of electronic circuits in common so that an output of said at least one of sensors is applied to said plurality of electronic circuits.*

*24. A system according to claim 23, wherein said electronic circuit detected to be abnormal is able to be replaced with a spare electronic circuit by the driver.*

*25. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for calculating fuel injection amounts based upon sensed engine operating conditions to control said at least one injector for supplying said cylinders of said first group with fuel; and*

*a second electronic circuit for calculating fuel injection amounts based upon sensed engine operating conditions to control said at least one injector for supplying said cylinders of said second group with fuel, said first and second electronic circuits having no portion thereof which operates in common to control the outputs of both said first electronic circuit and said second electronic circuit.*

*26. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a plurality of sensors for detecting information necessary for operating said internal combustion engine;*

*a first electronic circuit for controlling said at least one injector for supplying said cylinders of said first group with fuel, on the basis of outputs of sensors in said plurality of sensors; and*

*a second electronic circuit for controlling said at least one injector for supplying said cylinders of said second group with fuel, on the basis of outputs of sensors in said plurality of sensors, the first and second electronic circuits having no portion which operates in common to control the outputs of both said first electronic circuit and said second electronic circuit.*

*27. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a plurality of sensors for detecting information necessary for operating said internal combustion engine;*

*a first electronic circuit for controlling said at least one injector for supplying said cylinders of said first group with fuel, on the basis of outputs of sensors in said plurality of sensors; and*

*a second electronic circuit for controlling said at least one injector for supplying said cylinders of said second group with fuel, on the basis of outputs of sensors in said plurality of sensors, the first and second electronic circuits having no portion which operates in common to control the outputs of both said first electronic circuit and said second electronic circuit;*

*wherein at least one of said sensors is utilized for said first and second electronic circuits in common so that an output of said at least one of sensors is applied to said first and second electronic circuits.*

*28. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a plurality of sensors for detecting information necessary for operating said internal combustion engine;*

*a first electronic circuit for controlling said at least one injector for supplying said cylinders of said first group with fuel, on the basis of outputs of sensors in said plurality of sensors;*

*a second electronic circuit for controlling said at least one injector for supplying said cylinders of said second group with fuel, on the basis of outputs of sensors in said plurality of sensors, the first and second electronic circuits having no portion which operates in common to control the outputs of both said first electronic circuit and said second electronic circuit; and*

*detection means for detecting abnormality of said first and second electronic circuits.*

*29. A system according to claim 28, wherein said internal combustion engine is operated with the at least one injector controlled by the electronic circuit other than the electronic circuit detected to be abnormal.*

*30. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a plurality of sensors for detecting information necessary for operating said internal combustion engine;*

*a first electronic circuit for controlling said at least one injector for supplying said cylinders of said first group with fuel, on the basis of outputs of sensors in said plurality of sensors;*

*a second electronic circuit for controlling said at least one injector for supplying said cylinders of said second group with fuel, on the basis of outputs of sensors in said plurality of sensors, the first and second electronic circuits having no portion which operates in common to control the outputs of both said first electronic circuit and said second electronic circuit;*

*detection means for detecting abnormality of said first and second electronic circuits; and*

*means for giving a driver information of the electronic circuit detected to be abnormal by said detection means.*

*31. A system according to claim 30, wherein said electronic circuit detected to be abnormal is able to be replaced with a spare electronic circuit by the driver.*

*32. A system for controlling, an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a plurality of sensors for detecting information necessary for operating said internal combustion engine;*

*a first electronic circuit for controlling said at least one injector for supplying said cylinders of said first group with fuel, on the basis of outputs of sensors in said plurality of sensors;*

*a second electronic circuit for controlling said at least one injector for supplying said cylinders of said second group with fuel, on the basis of outputs of sensors in said plurality of sensors, the first and second electronic circuits having no portion which operates in common to control the outputs of both said first electronic circuit and said second electronic circuit; and*

*detection means for detecting abnormality of said first and second electronic circuits;*

*wherein at least one of said sensors is utilized for said first and second electronic circuits in common so that an output of said at least one of sensors is applied to said first and second electronic circuits.*

*33. A system according to claim 32, wherein said internal combustion engine is operated with the at least one injector controlled by the electronic circuit other than the electronic circuit detected to be abnormal.*

*34. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a plurality of sensors for detecting information necessary for operating said internal combustion engine;*

*a first electronic circuit for controlling said at least one injector for supplying said cylinders of said first group with fuel, on the basis of outputs of sensors in said plurality of sensors;*

*a second electronic circuit for controlling said at least one injector for supplying said cylinders of said second group with fuel, on the basis of outputs of sensors in said plurality of sensors, the first and second electronic circuits having no portion which operates in common to control the outputs of both said first electronic circuit and said second electronic circuit;*

*detection means for detecting abnormality of said first and second electronic circuits; and*

*means for giving a driver information of the electronic circuit detected to be abnormal by said detection means;*

*wherein at least one of said sensors is utilized for said first and second electronic circuits in common so that an output of said at least one of sensors is applied to said first and second electronic circuits.*

*35. A system according to claim 34, wherein said electronic circuit detected to be abnormal is able to be replaced with a spare electronic circuit by the driver.*

*36. A system for controlling an electronic fuel injection to an internal combustion engine comprising:*

*a plurality of cylinders provided in said internal combustion engine and divided into two groups;*

*a plurality of injectors for supplying said cylinders with fuel, respectively, said injectors being divided into two groups in correspondence with said two groups of cylinders;*

*two electronic circuits for controlling said two groups of injectors, respectively;*

*decision circuits for judging whether or not the operations of said two electronic circuits are normal; and*

*means for stopping the supply of fuel which is controlled by an electronic circuit which has been judged to be abnormal, while continuing the supply of fuel which is controlled by an electronic circuit which has been judged to be normal.*

*37. A system according to claim 36, wherein said means for stopping comprises a switch in a vehicle.*

*38. A system for controlling an electronic fuel injection to an internal combustion engine comprising:*

*a plurality of cylinders provided in said internal combustion engine and divided into two groups;*

*a plurality of injectors for supplying said cylinders with fuel, respectively, said injectors being divided into two groups in correspondence with said two groups of cylinders;*

*two electronic circuits for controlling said two groups of injectors, respectively;*

*means for judging whether or not the operations of said two electronic circuits are normal;*

*means for stopping the supply of fuel which is controlled by the electronic circuit which has been judged to be abnormal, while continuing the supply of fuel which is controlled by the electronic circuit which has been judged to be normal; and*

*means for giving a driver information of the electronic circuit which has been judged to be abnormal.*

*39. A system according to claim 38, wherein said means for stopping comprises a switch in a vehicle.*

*40. A system according to claim 38, wherein said electronic circuit which has been judged to be abnormal is able to be replaced with a spare electronic circuit by the driver.*

*41. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for controlling said at least one injector for supplying said cylinders of said first group with fuel;*

*a second electronic circuit for controlling said at least one injector for supplying said cylinders of said second group with fuel;*

*means for judging whether or not the operations of said first and second electronic circuits are normal; and*

*means for stopping the supply of fuel which is controlled by the electronic circuit which has been judged to be abnormal, while continuing the supply of fuel which is controlled by the electronic circuit which has been judged to be normal.*

*42. A system according to claim 41, wherein said means for stopping comprises a switch in a vehicle.*

*43. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for controlling said at least one injector for supplying said cylinders of said first group with fuel;*

*a second electronic circuit for controlling said at least one injector for supplying said cylinders of said second group with fuel;*

*means for judging whether or not the operations of said first and second electronic circuits are normal;*

*means for stopping the supply of fuel which is controlled by the electronic circuit which has been judged to be abnormal, while continuing the supply of fuel which is controlled by the electronic circuit which has been judged to be normal; and*

*means for giving a driver information of the electronic circuit which has been judged to be abnormal.*

*44. A system according to claim 43, wherein said means for stopping comprises a switch in a vehicle.*

*45. A system according to claim 43, wherein said electronic circuit which has been judged to be abnormal is able to be replaced with a spare electronic circuit by the driver.*

*46. A system for controlling an electronic fuel injection to an internal combustion engine comprising:*

*a plurality of cylinders provided in said internal combustion engine and divided into two groups;*

*a plurality of injectors for supplying said cylinders with fuel, respectively, said injectors being divided into two groups in correspondence with said two groups of cylinders;*

*two electronic circuits for controlling said two groups of injectors, respectively;*

*means for judging whether or not the operation of each of said two electronic circuits is normal on the basis of a time-sequential change of the calculated output of fuel injection delivered out of each of said electronic circuits; and*

*means for stopping the supply of fuel which is controlled by the electronic circuit which has been judged to be abnormal, while continuing the supply of fuel which is controlled by the electronic circuit which has been judged to be normal.*

*47. A system according to claim 46, wherein said means for stopping comprises a switch in a vehicle.*

*48. A system for controlling an electronic fuel injection to an internal combustion engine comprising:*

*a plurality of cylinders provided in said internal combustion engine and divided into two groups;*

*a plurality of injectors for supplying said cylinders with fuel, respectively, said injectors being divided into two groups in correspondence with said two groups of cylinders;*

*two electronic circuits for controlling said two groups of injectors, respectively;*

*means for judging whether or not the operation of each of said two electronic circuits is normal on the basis of a time-sequential change of the calculated output of fuel injection delivered out of each of said electronic circuit;*

*means for stopping the supply of fuel which is controlled by the electronic circuit which has been judged to be abnormal, while continuing the supply of fuel which is controlled by the electronic circuit which has been judged to be normal; and*

*means for giving a driver information of the electronic circuit which has been judged to be abnormal.*

*49. A system according to claim 48, wherein said means for stopping comprises a switch in a vehicle.*

*50. A system according to claim 48, wherein said electronic circuit which has been judged to be abnormal is able to be replaced with a spare electronic circuit by the driver.*

*51. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for controlling said at least one injector for supplying said cylinders of said first group with fuel;*

*a second electronic circuit for controlling said at least one injector for supplying said cylinders of said second group with fuel;*

*means for judging whether or not the operation of each of said first and second electronic circuits is normal on the basis of a time-sequential change of the calculated output of fuel injection delivered out of each of said first and second electronic circuits; and*

*means for stopping the supply of fuel which is controlled by the electronic circuit which has been judged to be abnormal, while continuing the supply of fuel which is controlled by the electronic circuit which has been judged to be normal.*

*52. A system according to claim 51, wherein said means for stopping comprises a switch in a vehicle.*

*53. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for controlling said at least one injector for supplying said cylinders of said first group with fuel;*

*a second electronic circuit for controlling said at least one injector for supplying said cylinders of said second group with fuel;*

*means for judging whether or not the operation of each of said first and second electronic circuits is normal on the basis of a time-sequential change of the calculated output of fuel injection delivered out of each of said first and second electronic circuits;*

*means for stopping the supply of fuel which is controlled by the electronic circuit which has been judged to be abnormal, while continuing the supply of fuel which is controlled by the electronic circuit which has been judged to be normal; and*

*means for giving a driver information of the electronic circuit which has been judged to be abnormal.*

*54. A system according to claim 53, wherein said means for stopping comprises a switch in a vehicle.*

55. A system according to claim 53, wherein said electronic circuit which has been judged to be abnormal is able to be replaced with a spare electronic circuit by the driver.

56. A system according to claim 4, wherein the electronic circuit judged to be abnormal is able to be replaced with a spare electronic circuit by the driver.

57. A system according to claim 6, wherein said electronic circuit decided to be abnormal, is able to be replaced with a spare circuit by the driver.

58. A system for controlling an electric fuel injection to an internal combustion engine having a plurality of cylinders, comprising:

at least one injector for supplying some of said cylinders with fuel;

at least one injector for supplying remaining cylinders with fuel; and respective electronic circuits each calculating fuel injection amounts to be supplied to said cylinders based upon sensed engine operating conditions to control each of the injectors, independently, said electronic circuits having no portion thereof which operates in common with another electronic circuit to control the outputs of all electronic circuits.

59. A system for controlling an electric fuel injection to an internal combustion engine having a plurality of cylinders, comprising:

at least one injector for supplying one group of said cylinders with fuel;

at least one injector for supplying the other group of said cylinders with fuel;

respective electronic circuits for controlling each of said injectors, independently, said electronic circuits having no portion thereof which operates in common with another electronic circuit to control the outputs of all electronic circuits; and two electronic decision circuits for judging whether or not the operation of each of said electronic circuits is normal.

60. A system for controlling electronic fuel injection to an internal combustion engine comprising:

a plurality of cylinders provided in said internal combustion engine and divided into a plurality of groups;

a plurality of injectors for supplying said cylinders with fuel, respectively, said injectors being divided into a plurality of groups in correspondence with said groups of cylinders;

a plurality of sensors for detecting information necessary for operating said internal combustion engine;

a plurality of electronic circuits for controlling said groups of injectors, respectively, on the basis of outputs of said sensors, said electronic circuits having no portion thereof which operates in common with another electronic circuit to control the outputs of said plurality of electronic circuits; and detection means provided in correspondence to the respective electronic circuits for detecting an abnormality of said electronic circuits.

61. An internal combustion engine comprising:

a plurality of cylinders arranged to form cylinder banks of V-type;

control circuits each of which is provided in correspondence to a respective one of said cylinder banks to control actions of cylinders in each of the cylinder banks;

fuel injection and ignition systems each of which is provided in correspondence to a respective one of cylinder banks;

a plurality of sensors for detecting conditions in the actions of cylinders in each of the cylinder banks and for supplying outputs representing detected conditions to said control circuits; and means for stopping the supply of fuel to the cylinder bank which is controlled by a control circuit if said control circuit is detected to be abnormal.

62. A system for controlling an electronic fuel injection to an internal combustion engine comprising:

a plurality of cylinders provided in said internal combustion engine and divided into two groups;

a plurality of injectors for supplying said cylinders with fuel, respectively, said injectors being divided into two groups in corresponding with said two groups of cylinders;

two substantially identical electronic circuits for controlling said two groups of injectors, respectively;

decision circuits for judging whether or not the operations of said two electronic circuits are normal on the basis of comparison of a calculated output of fuel injection delivered out of each of said electronic circuits with tolerance limit values in each of said circuits; and means for stopping the supply of fuel which is controlled by the electronic circuit which has been judged to be abnormal, while continuing the supply of fuel which is controlled by the electronic circuit which has been judged to be normal.

63. A system for controlling an electronic fuel injection to an internal combustion engine comprising:

a plurality of cylinders provided in said internal combustion engine and divided into two groups;

a plurality of injectors for supplying said cylinders with fuel, respectively, said injectors being divided into two groups in correspondence with said two groups of cylinders;

two substantially identical electronic circuits for controlling said two groups of injectors, respectively;

decision circuits for judging whether or not the operations of said two electronic circuits are normal on the basis of comparison of a calculated output of fuel injection delivered out of each of said electronic circuit with tolerance limit values in each of said circuits;

means for stopping the supply of fuel which is controlled by the electronic circuit which has been judged to be abnormal, while continuing the supply of fuel which is controlled by the electronic circuit which has been judged to be normal; and means for giving a driver information of the electronic circuit which has been judged to be abnormal.

64. A system for controlling an electronic fuel injection to an internal combustion engine comprising:

a plurality of cylinders provided in said internal combustion engine and divided into first and second groups;

at least one injector for supplying the cylinders of said first group with fuel;

at least one injector for supplying the cylinders of said second group with fuel;

a first electronic circuit for controlling said at least one injector for supplying said cylinders of said first group with fuel;

a second electronic circuit, which is substantially identical to said first electronic circuit, for controlling said at least one injector for supplying said cylinders of said second group with fuel;

means for judging whether or not the operations of said first and second electronic circuits are normal on the basis of comparison of a calculated output of fuel

*injection delivered out of each of said electronic circuits with tolerance limit values in each of said circuits; and*

*means for stopping the supply of fuel which is controlled by the electronic circuit which has been judged to be abnormal, while continuing the supply of fuel which is controlled by the electronic circuit which has been judged to be normal.*

*65. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for controlling said at least one injector for supplying said cylinders of said first group with fuel;*

*a second electronic circuit, which is substantially identical to said first electronic circuit, for controlling said at least one injector for supplying said cylinders of said second group with fuel;*

*means for judging whether or not the operation of said first and second electronic circuits are normal on the basis of comparison of a calculated output of fuel injection delivered out of each of said electronic circuits with tolerance limit values in each of said circuits;*

*means for stopping the supply of fuel which is controlled by the electronic circuit which has been judged to be abnormal, while continuing the supply of fuel which is controlled by the electronic circuit which has been judged to be normal; and*

*means for giving a driver information of the electronic circuit which has been judged to be abnormal.*

*66. A system for controlling an electric fuel injection to an internal combustion engine having a plurality of cylinders, comprising:*

*at least one injector for supplying a part of said cylinders with fuel;*

*at least one injector for supplying the rest part of said cylinders with fuel;*

*two substantially identical electronic circuits for controlling said two groups of injectors, respectively;*

*decision circuits for judging whether or not the operations of said two electronic circuits are normal on the basis of comparison of a calculated output of fuel injection delivered out of each of said electronic circuits with tolerance limit values in each of said circuits; and*

*means for giving a driver information indicating the electronic circuit which has been judged to be abnormal.*

*67. A method of controlling an electronic fuel injection to an internal combustion engine comprising the steps of:*

*dividing a plurality of cylinders provided in said internal combustion engine into two groups;*

*providing a plurality of injectors for supplying fuel to said cylinders, and dividing said injectors into two groups in correspondence with said two groups of cylinders;*

*providing two electronic circuits each calculating fuel injection amounts to be supplied to said cylinders based upon sensed engine operating conditions to control said two groups of injectors, respectively;*

*judging whether or not the operation of each of said two electronic circuits is normal; and*

*executing a predetermined operation for fuel supply by the electronic circuit when the electronic circuit has been judged to be abnormal.*

*68. A method of controlling an electronic fuel injection to an internal combustion engine comprising the steps of:*

*dividing a plurality of cylinders provided in said internal combustion engine into first and second groups;*

*providing at least one injector for supplying fuel to the cylinders of said first group and at least one injector for supplying fuel to the cylinders of said second group;*

*providing a first electronic circuit for calculating fuel injection amounts based upon sensed engine operating conditions to control said at least one injector for supplying fuel to said cylinders of said first group and a second electronic circuit for calculating fuel injection amounts based upon sensed engine operating conditions to control said at least one injector for supplying fuel to said cylinders of said second group;*

*judging whether or not the operation of each of said first and second electronic circuits is normal; and*

*executing a predetermined operation for fuel supply by the electronic circuit when the electronic circuit has been judged to be abnormal.*

*69. A system for controlling an electronic fuel injection to an internal combustion engine comprising:*

*a plurality of cylinders provided in said internal combustion engine and divided into a plurality of groups;*

*a plurality of injectors for supplying said cylinders with fuel, respectively, said injectors being divided into a plurality of groups in correspondence with said groups of cylinders;*

*a plurality of electronic circuits each calculating fuel injection amounts to be supplied to said cylinders based upon sensed engine operation conditions to control said groups of injectors, respectively;*

*means for judging whether or not the operation of each of said electronic circuits is normal; and*

*means for executing a predetermined operation for fuel supply by the electronic circuit which has been judged to be abnormal.*

*70. A system for controlling an electronic fuel injection to an internal combustion engine comprising:*

*a plurality of cylinders provided in said internal combustion engine and divided into first and second groups;*

*at least one injector for supplying the cylinders of said first group with fuel;*

*at least one injector for supplying the cylinders of said second group with fuel;*

*a first electronic circuit for calculating fuel injection amounts based upon sensed engine operating conditions to control said at least one injector for supplying said cylinders of said first group with fuel;*

*a second electronic circuit for calculating fuel injection amounts based upon sensed engine operating conditions to control said at least one injector for supplying said cylinders to said second group with fuel;*

*means for judging whether or not the operation of each of said first and second electronic circuits is normal; and*

*means for executing a predetermined operation for fuel supply by the electronic circuit which has been judged to be abnormal.*

*71. A system for controlling an electronic fuel injection to an internal combustion engine having a plurality of cylinders divided into two groups symmetrically arranged so that the combustion in each of said cylinders drives a common crankshaft, said system comprising:*

*a plurality of injectors for supplying said two groups of cylinders with fuel, respectively, said injectors being divided into two groups in correspondence with said two groups of cylinders;*

*a first electronic circuit for calculating fuel injection amounts based upon sensed engine operating conditions to control the operation of one of said two groups of injectors;*

*a second electronic circuit for calculating fuel injection amounts based upon sensed engine operating conditions to control the operation of the other of said two groups of injectors; and*

*means for continuing the operation of one of said two groups of the injectors when an the abnormality occurs in the output of the electronic circuit controlling the operation of the other groups of the injectors.*

*72. A system for controlling an electronic fuel injection to an internal combustion engine having a plurality of cylinders divided into two groups symmetrically arranged so that the combustion in each of said cylinders drives a common crankshaft, said system comprising two parts each of which includes:*

*one of the two groups of cylinders;*

*at least one injector for supplying said one of the two groups of cylinders with fuel; and*

*an electronic circuit for calculating fuel injection amounts based upon sensed engine operating conditions to control said at least one injector;*

*wherein each of said two parts of the system is able to operate independently of the other part, irrespective of an abnormality in the other part.*

* * * * *